(12) United States Patent
Sugimoto et al.

(10) Patent No.: US 9,225,037 B2
(45) Date of Patent: Dec. 29, 2015

(54) LITHIUM SECONDARY BATTERY USING IONIC LIQUID

(75) Inventors: Toshinori Sugimoto, Kyoto (JP); Tetsuya Higashizaki, Kyoto (JP); Eriko Ishiko, Kyoto (JP); Michiyuki Kono, Kyoto (JP); Masashi Ishikawa, Suita (JP)

(73) Assignees: Dai-Ichi Kogyo Seiyaku Co., Ltd., Kyoto (JP); A School Corporation Kansai University, Osaka (JP)

( * ) Notice: Subject to any disclaimer, the term of this patent is extended or adjusted under 35 U.S.C. 154(b) by 0 days.

(21) Appl. No.: 13/635,837

(22) PCT Filed: Jan. 17, 2011

(86) PCT No.: PCT/JP2011/000198
§ 371 (c)(1),
(2), (4) Date: Sep. 27, 2012

(87) PCT Pub. No.: WO2011/114605
PCT Pub. Date: Sep. 22, 2011

(65) Prior Publication Data
US 2013/0017456 A1    Jan. 17, 2013

(30) Foreign Application Priority Data
Mar. 19, 2010  (JP) ................. 2010-064172

(51) Int. Cl.
*H01M 10/052* (2010.01)
*H01M 4/505* (2010.01)
*H01M 4/525* (2010.01)
*H01M 10/0569* (2010.01)

(52) U.S. Cl.
CPC ............ *H01M 10/052* (2013.01); *H01M 4/505* (2013.01); *H01M 4/525* (2013.01); *H01M 10/0569* (2013.01); *Y02E 60/122* (2013.01)

(58) Field of Classification Search
None
See application file for complete search history.

(56) References Cited

U.S. PATENT DOCUMENTS

| | | | |
|---|---|---|---|
| 7,601,463 B2 | 10/2009 | Inagaki et al. | |
| 2006/0088767 A1* | 4/2006 | Li et al. | ............ 429/231.95 |
| 2009/0169992 A1 | 7/2009 | Ishiko et al. | |
| 2010/0183918 A1* | 7/2010 | Wakita et al. | ............ 429/207 |

FOREIGN PATENT DOCUMENTS

| | | |
|---|---|---|
| JP | 2006066341 | 3/2006 |
| JP | 2007207675 | 8/2007 |
| JP | 2008511967 | 4/2008 |
| JP | 2009004289 | 1/2009 |

* cited by examiner

*Primary Examiner* — Carlos Barcena
*Assistant Examiner* — Wojciech Haske
(74) *Attorney, Agent, or Firm* — Jordan and Hamburg LLP

(57) ABSTRACT

A flame-retardant lithium secondary battery is provided that has better battery performance and higher safety than conventional batteries. The lithium secondary battery uses a positive electrode that includes a positive electrode active material of the general formula (1) below, and a nonaqueous electrolytic solution in which an ionic liquid that contains bis(fluorosulfonyl)imide anions as an anionic component is used as the solvent, (1) $LiNi_xMn_yO_4$, wherein x and y are values that satisfy the relations $x+y=2$, and $x:y=27.5:72.5$ to $22.5:77.5$.

4 Claims, No Drawings

LITHIUM SECONDARY BATTERY USING IONIC LIQUID

BACKGROUND OF THE INVENTION

The present invention relates to lithium secondary batteries that use an ionic liquid as a flame-retardant nonaqueous electrolytic solution. More specifically, the present invention relates to lithium secondary batteries that use a nonaqueous electrolytic solution that contains bis(fluorosulfonyl)imide anions.

Lithium secondary batteries are small, light chargeable batteries with a large storage capacity per unit volume or unit weight, and are used in a wide range of devices, including cell phones, laptop personal computers, personal digital assistances (PDAs), video cameras, and digital cameras. Lithium secondary batteries have thus become indispensable for various small-sized, light-weight portable devices having relatively large power consumption. Development is also underway for middle-sized or large-sized lithium batteries for installation in electric bicycles and electric automobiles, and the development of these lithium batteries is expected to provide a means to reduce the environmental load.

Conventionally, polar nonprotonic organic solvents that easily dissolve lithium salts and that do not easily undergo electrolysis have been used as the nonaqueous solvents for the nonaqueous electrolytic solution of lithium secondary batteries. However, there is a serious problem in battery safety, because these organic solvents have very low flash points, and may cause fire or explosion by the heat of overcharge or shorting. The safety problem has not been more important than it is today in the face of the urgent need for the development of large-capacity and high-output lithium secondary batteries in response to the development of smaller and lighter electronic devices and the development of electric automobiles. Use of a flame-retardant ionic liquid for the nonaqueous electrolytic solution of lithium secondary batteries has thus been investigated in many studies.

Specifically, an ionic liquid containing bis(fluorosulfonyl) imide anions (FSI anions) as an anionic component has lower viscosity than other ionic liquids. Further, this type of ionic liquid is nonflammable, and provides high energy density and high voltage while maintaining high performance even in high-rate charging and discharge. Use of this ionic liquid as the solvent of the nonaqueous electrolytic solution can thus provide a lithium battery having high safety (Patent Document 1).

However, the lithium batteries using a combination of common graphitized carbon electrodes and the ionic liquid have higher internal resistance than the organic solvent batteries, and the output characteristics are poor. Further, the lifetime characteristics tend to be low for reasons attributable to, for example, deposition of the lithium and decomposed materials on the negative electrode surface. For these reasons, the performance levels are not sufficient for practical applications.

Lithium secondary batteries using a flame-retardant ionic liquid have thus been investigated by way of developing new battery constituent materials and examining additives to improve battery performance. See JP-A-2007-207675.

SUMMARY OF THE INVENTION

The present invention has been made to meet the strong need for improving the safety of lithium secondary batteries, and it is an object of the present invention to provide a flame-retardant lithium secondary battery having better battery performance and higher safety than conventional batteries.

A lithium secondary battery of the present invention includes a positive electrode, a negative electrode, a separator provided between the positive electrode and the negative electrode, and a nonaqueous electrolytic solution that contains a lithium salt. In order to solve the foregoing problems, the positive electrode includes a positive electrode active material of the general formula (1) below, and an ionic liquid that contains bis(fluorosulfonyl)imide anions as an anionic component is used as the solvent in the nonaqueous electrolytic solution.

$$LiNi_xMn_yO_4 \qquad (1)$$

In the formula (1), x and y are values that satisfy the relations x+y=2, and x:y=27.5:72.5 to 22.5:77.5.

The lithium secondary battery of the present invention may have a fully charged voltage of 4.4 V or more, and a average discharge voltage of 4.0 V or more.

Advantage of the Invention

By using the flame-retardant ionic liquid, the lithium secondary battery of the present invention can solve the battery shorting, fire, and explosion problems caused by an internal temperature increase as might occur because of a poor battery environment or accidents, and can provide excellent safety without the risk of causing fire or explosion by the heat of overcharge or shorting.

Further, the battery can have excellent potential flatness and excellent charge and discharge characteristics in high potential regions, because the battery uses an ionic liquid that contains bis(fluorosulfonyl)imide anions as an anionic component, and because a lithium-manganese-nickel composite oxide having a predetermined manganese-to-nickel atom ratio is used for the positive electrode.

Mode for Carrying Out the invention

The ionic liquid contained in the lithium secondary battery of the present invention contains bis(fluorosulfonyl)imide anions as an anionic component, as described above. Other anionic components, such as bis(trifluoromethylsulfonyl)imide anions, may be contained within the intended scope of the present invention.

The cationic component is not particularly limited, and compounds containing one or more elements selected from N, P, S, O, C, and Si in the structure, and having a linear or a cyclic structure such as a five-membered ring or a six-membered ring, in the backbone may be used. Specific examples of the nitrogen-containing cations include alkylammonium such as trimethyl-N-propylammonium and triethylammonium; imidazolium such as ethylmethylimidazolium and butylmethylimidazolium; pyrrolidinium such as N-methyl-N-propylpyrrolidinium; and piperidinium such as N-methyl-N-propylpiperidinium.

In the present invention, the lithium salt dissolved in the ionic liquid as a supporting electrolyte for the nonaqueous electrolytic solution is not particularly limited, and common lithium salts used as electrolytes for nonaqueous electrolytic solutions may be used. Examples of such lithium salts include $LiPF_6$, $LiBF_4$, $LiClO_4$, $LiAsF_6$, $LiCF_3SO_3$, $LiC(CF_3SO_2)_3$, $LiN(CF_3SO_2)_2$, $LiN(FSO_2)_2$, and $LiBC_4O_8$.

Desirably, the lithium salt is contained in the ionic liquid in a concentration of typically 0.1 to 2.0 mol/kg, preferably 0.3 to 1.5 mol/kg.

The positive electrode used in the present invention is one that uses a spinel-type composite oxide containing manganese or nickel, as the positive electrode active material. The nickel-to-manganese atom ratio in the composite oxide is preferably Ni:Mn=27.5:72.5 to 22.5:77.5, more preferably Ni:Mn=25:75. A specific preferred example is $LiNi_{0.5}Mn_{1.5}O_4$. Al, Ca, Fe, and Cu may be contained within the intended scope of the present invention. The method used to prepare the lithium-manganese-nickel composite oxide positive electrode material is not particularly limited, and known methods such as a composite carbonate method may be used.

With the nonaqueous electrolytic solution using the ionic liquid in combination with the positive electrode that uses the composite oxide as the positive electrode material, the charge and discharge cycle characteristics can be improved compared to conventional batteries that use a positive electrode active material mainly composed of lithium metal oxides. Further, a high capacity can be maintained, because a voltage drop due to repeated charge and discharge in high potential regions is smaller.

The lithium secondary battery of the present invention can be produced according to methods used to produce conventional lithium secondary batteries, except for using the positive electrode active material and the nonaqueous electrolytic solution, as follows.

The positive electrode is obtained by first mixing the positive electrode active material with a conductive agent component. The powdery mixture is then added to a binder and dispersed therein. As required, a dispersion medium is added to dilute the mixture to a desired concentration. The resulting positive electrode coating material is then applied to the surface of a positive electrode collector such as an aluminum foil. The positive electrode is obtained upon drying the coating. As required, this is followed by post-processes, such as a roller press process performed to obtain a predetermined press density.

The thickness of the positive electrode mixture layer containing the positive electrode active material and the conductive agent and formed on the surface of the positive electrode collector is preferably 50 μm or less, more preferably 10 to 50 μm on each side, in order to maintain sufficient electron conductivity for the positive electrode mixture layer itself even in high-rate current charging and discharge. When the positive electrode mixture layer is too thick, the electron conductivity lowers along the thickness of the positive electrode mixture layer. The increased resistance may lead to a significant drop in lifetime characteristics in high-rate charging and discharge.

The negative electrode is not particularly limited, provided that the metal lithium or lithium ions can be inserted and/or released. Known materials such as alloy materials, silicon materials, and hard carbon may be used.

Specifically, a collector coated with a material obtained by mixing a negative electrode active material and a binder may be used.

The negative electrode active material is not particularly limited, and known active materials may be used. Examples include carbon materials such as natural graphite, artificial graphite, non-graphitizable carbon, and graphitizable carbon; metallic materials such as metal lithium or alloys, and tin compounds; lithium transition metal nitrides, crystalline metal oxides, amorphous metal oxides, and conductive polymers.

Electron conductive materials that do not have adverse effects on battery performance may be used as the conductive agent used for the positive electrode and the negative electrode. Typically, carbon blacks such as acetylene black and Ketjen black are used. Other usable conductive materials include natural graphite (such as scaly graphite, scale-like graphite, and earthy graphite), artificial graphite, carbon whisker, a carbon fiber or metal (such as copper, nickel, aluminum, silver, and gold) powder, metal fibers, and conductive ceramic materials. These may be contained as a mixture of two or more. The conductive material may be added in preferably 1 to 30 weight %, particularly preferably 2 to 20 weight % with respect to the amount of the active material.

Any electron conductor may be used as the collector of the electrode active material, provided that the electron conductor does not have adverse effects in the product battery. Examples of the positive electrode collector include aluminum, titanium, stainless steel, nickel, calcined carbon, conductive polymers, and conductive glass. Further, surface-treated materials such as aluminum or copper treated with carbon, nickel, titanium, silver or the like, may also be used for the purpose of improving adhesion, conductivity, and oxidation resistance. Examples of the negative electrode collector include copper, stainless steel, nickel, aluminum, titanium, calcined carbon, conductive polymers, conductive glass, and Al—Cd alloys. Further, surface-treated materials such as aluminum or copper treated with carbon, nickel, titanium, silver or the like, may also be used for the purpose of improving adhesion, conductivity, and oxidation resistance.

The surfaces of these collector materials may be subjected to an oxidation, treatment. The collector materials may have a form of a foil, a film, a sheet, or a net, or may be punched or expanded, or may be a lath, porous, or molded such as foamed material. The thickness is not particularly limited, and is typically 1 to 100 μm.

The binder used to bind the active materials to the positive electrode and the negative electrode is not limited and examples thereof include polyvinylidene fluoride (PVDF) PVDF copolymer resins such as copolymers of PVDF with hexafluoropropylene (HFP) perfluoromethylvinylether (PFMV) or tetrafluoroethylene (TFE) fluororesins such as polytetrafluoroethylene (PTFE) or fluororubber; and polymers such as styrene-butadiene rubber (SER), an ethylene-propylene rubber (EPDM) or styrene-acrylonitrile copolymer. These may be combined with polysaccharides such as carboxymethylcellulose (CMC), or with thermoplastic resins such as polyimide resin. Further, these may be used as a mixture of two or more. The binder is added preferably in 1 to 30 weight %, particularly preferably 2 to 20 weight % with respect to the amount of the active material.

A porous film is used as the separator. Preferred examples include microporous polymer films, and nonwoven fabrics. Porous films of polyolefin polymer are particularly preferred. Specific examples include microporous films of polyethylene or polypropylene, laminated films of a porous polyethylene film and polypropylene, nonwoven fabrics of fibers such as a polyester fiber, an aramid fiber, and a glass fiber, with or without silica, alumina, titania, or other ceramic fine particles adhering to the surface.

The lithium secondary battery of the present invention may be formed into any shape, including a cylindrical shape, a coin shape, and a rectangular shape. The basic battery configuration remains the same irrespective of the shape, and the design may be changed according to the intended use. For example, in the case of a cylindrical battery, a negative electrode obtained by applying a negative electrode active material to the negative electrode collector, and a positive electrode obtained by applying a positive electrode active material to the positive electrode collector are wound around via a separator to prepare a wound unit. With the wound unit housed inside a battery canister, the nonaqueous electrolytic solution is injected, and the battery is sealed with the upper and lower insulating plates in place, in the case of a coin-shaped lithium secondary battery, a disc-shaped negative electrode, a separator, a disc-shaped positive electrode, and a stainless steel plate are laminated and housed inside a coin-shaped battery canister, and the battery is sealed after injecting the nonaqueous electrolytic solution.

DETAILED DESCRIPTION OF THE INVENTION

The present invention is described below in more detail using examples. The present invention, however, is not limited by the following examples. In the following, the mixture ratio and "%" are by weight, unless otherwise stated.

Example 1

Fabrication of Positive Electrode 100 g of $LiNi_{0.5}Mn_{1.5}O_4$ as a positive electrode active material, 7.8 g of carbon black as a conductive agent (Super-P produced by Timcal), 3.3 g of PVDF as a binder, and 38.4 g of N-methyl-2-pyrrolidone (NMP) as a dispersion medium were mixed using a planetary mixer to prepare a positive electrode coating liquid having a solid content of 56%. The coating liquid was coated over a 20 μm-thick aluminum foil using a coater, and dried at 130° C. A positive electrode with a positive electrode active material weight of 7.5 mg/cm² was then obtained after a roller press process.
<Fabrication of Negative Electrode>
100 g of Graphite as a negative electrode active material, 0.55 g of carbon black as a conductive agent (Super-P produced by Timcal), 8.7 g of PVDF as a binder, and 79.1 g of NMP as a dispersion medium were mixed using a planetary mixer to prepare a negative electrode coating liquid having a solid content of 58%. The coating liquid was coated over a 10 μm-thick electrolytic copper foil using a coater, and dried at 130° C. A negative electrode with a negative electrode active material weight of 3.2 mg/cm² was then obtained after a roller press process.
<Fabrication of Lithium Secondary Battery>
A 40 μm-thick polyethylene separator was sandwiched between the positive and negative electrodes to prepare a laminate. After welding a tab lead for drawing out a terminal, the laminate was placed in a folded aluminum laminate pack to prepare a lithium secondary battery having a positive electrode area of 18 cm² and a negative electrode area of 19.84 cm². Then, a solution dissolving 1.2 mol/kg of LiTFSI in an N-methyl-N-propyl-pyrrolidinium (MPPy)-FSI solvent was in acted as an electrolytic solution, and the aluminum laminate was sealed with a heat sealer at the opening to fabricate a test lithium secondary battery.

Examples 2 to 9, and Comparative Examples 1 to 9

Test lithium secondary batteries were fabricated in the same manner as in Example 1, except that the positive electrode active materials, the negative electrode active materials, the nonaqueous electrolytic solution solvents (ionic liquids except for Comparative Example 3), and the supporting electrolytes (lithium salts) presented in Table 1 were used. Note that two solvents were used in Example 5, and two negative electrode active materials were used in Example 6. The mixture ratios are given in brackets in the respective cells of Table 1.

The lithium secondary batteries fabricated in Examples and Comparative Examples were subjected to measurements of initial discharge capacity at 20° C. and capacity retention ratio after 20 cycles as performance tests. The measurements were performed as follows. The results are presented in Table 1,
<Discharge Capacity Per Weight of Positive Electrode Active Material>
The initial discharge capacity was measured at 25° C. using a charge/discharge tester. The batteries were charged to 4.8 V at C.C.-C.V. (constant current-constant voltage) under a current value of 0.1 C, and the charging was stopped after a charge time of 17 hours or at a current value of 0.05 C. The batteries were discharged to 3.0 V at C.C. (constant current) under a current value of 0.1 C. The discharge capacity per weight of the positive electrode active material was determined by dividing the measured initial discharge capacity by the weight of the positive electrode active material.
<Average Discharge Voltage>
Measurement was made using a charge and discharge device (ACD-10APS, Aska Electronic, Co., Ltd.)
<Capacity Retention Ratio After 20 Cycles>
The batteries were charged to 4.8 V at C.C.-C.V. (constant current-constant voltage) under a current value of 0.1 C. The charging was stopped after a charge time of 12 hours or at a current value of 0.05 C. The batteries were discharged to 3.0 V under a current value of 0.1 C in C.C. (constant current) conditions. The discharge capacity was measured after 1 cycle and after 20 cycles, and the discharge capacity retention ratio after 20 cycles (%) was calculated as the proportion of the discharge capacity after 20 cycles relative to the discharge capacity after 1 cycle.

TABLE 1

| | Positive electrode active material | Positive electrode thickness (excluding foil) [μm] | Negative electrode active material (mixture ratio) | Nonaqueous electrolytic solution solvent (mixture ratio) | Nonaqueous electrolytic solution supporting electrolyte lithium salt | Discharge capacity per weight of positive electrode active material [mAh/g] | Average discharge voltage [V] | Capacity retention ratio after 20 cycles (%) [$Q_{20\ cycle}/Q_{1\ cycle}$] |
|---|---|---|---|---|---|---|---|---|
| Ex. 1 | $LiNi_{0.5}Mn_{1.5}O_4$ | 27 | Natural graphite | MPPy-FSI | LiTFSI | 128 | 4.5 | 95 |
| Ex. 2 | $LiNi_{0.5}Mn_{1.5}O_4$ | 27 | Natural graphite | TMPA-FSI | LiTFSI | 128 | 4.5 | 94 |
| Ex. 3 | $LiNi_{0.5}Mn_{1.5}O_4$ | 27 | Natural graphite | MPPi-FSI | LiTFSI | 126 | 4.5 | 95 |
| Ex. 4 | $LiNi_{0.5}Mn_{1.5}O_4$ | 27 | Natural graphite | MPPy-FSI | LiFSI | 128 | 4.5 | 93 |
| Ex. 5 | $LiNi_{0.5}Mn_{1.5}O_4$ | 27 | Natural graphite | MPPy-FSI:MPPi-FSI (50:50) | LiTFSI | 128 | 4.5 | 95 |
| Ex. 6 | $LiNi_{0.5}Mn_{1.5}O_4$ | 27 | Natural graphite:Non-graphitizable carbon (50:50) | MPPy-FSI | LiTFSI | 121 | 4.4 | 94 |
| Ex. 7 | $LiNi_{0.5}Mn_{1.5}O_4$ | 27 | $NiSi_6C_7$ | MPPy-FSI | LiTFSI | 120 | 4.2 | 92 |

TABLE 1-continued

|  | Positive electrode active material | Positive electrode thickness (excluding foil) [μm] | Negative electrode active material (mixture ratio) | Nonaqueous electrolytic solution solvent (mixture ratio) | Nonaqueous electrolytic solution supporting electrolyte lithium salt | Discharge capacity per weight of positive electrode active material [mAh/g] | Average discharge voltage [V] | Capacity retention ratio after 20 cycles (%) [$Q_{20\ cycle}/Q_{1\ cycle}$] |
|---|---|---|---|---|---|---|---|---|
| Ex. 8 | $LiNi_{0.5}Mn_{1.5}O_4$ | 27 | Li | MPPy-FSI | LiTFSI | 128 | 4.6 | 98 |
| Ex. 9 | $LiNi_{0.5}Mn_{1.5}O_4$ | 27 | Non-graphitizable carbon | MPPy-FSI | LiTFSI | 110 | 4.0 | 90 |
| Com. Ex. 1 | $LiNi_{0.5}Mn_{1.5}O_4$ | 27 | Natural graphite | MPPy-TFSI | LiTFSI | 0 | 0 | 0 |
| Com. Ex. 2 | $LiNi_{0.5}Mn_{1.5}O_4$ | 27 | Natural graphite | TMPA-TFSI | LiTFSI | 0 | 0 | 0 |
| Com. Ex. 3 | $LiNi_{0.5}Mn_{1.5}O_4$ | 27 | Natural graphite | EC:DEC (30:70) | $LiPF_6$ | 128 | 4.5 | 93 |
| Com. Ex. 5 | $LiMn_{1/3}Ni_{1/3}Co_{1/3}O_2$ | 22 | Natural graphite | MPPy-FSI | LiTFSI | 148 | 3.7 | 94 |
| Com. Ex. 6 | $LiMn_2O_4$ | 27 | Natural graphite | MPPy-FSI | LiTFSI | 91 | 3.8 | 95 |
| Com. Ex. 7 | $LiNi_{0.8}Co_{0.15}Al_{0.05}O_2$ | 21 | Natural graphite | MPPy-FSI | LiTFSI | 152 | 3.7 | 93 |
| Com. Ex. 8 | $LiFePO_4$ | 33 | Natural graphite | MPPy-FSI | LiTFSI | 135 | 3.0 | 96 |
| Com. Ex. 9 | $LiNi_{0.5}Mn_{1.5}O_4$ | 27 | $Li_4Ti_5O_{12}$ | MPPy-TFSI | LiTFSI | 128 | 3.1 | 96 |

FSI: Bis(fluorosulfonyl)imide
TFSI: Bis(trifluoromethylsulfonyl)imide
TMPA: Trimethyl-N-propylammonium
Mppy: N-Methyl-N-propyl-pyrrolidinium
Mppi: N-Methyl-N-propyl-piperidinium
EC: Ethylene carbonate
DEC: Diethyl carbonate The lithium secondary battery of the present invention can be used for various portable devices, including cell phones, laptop personal computers, personal digital assistances (PDAs), video cameras, and digital cameras. The lithium secondary battery of the present invention is also useful as a middle-sized or large-sized lithium battery for installation in electric bicycles and electric automobiles.

The invention claimed is:

1. A lithium secondary battery comprising: a positive electrode; a negative electrode; a separator provided between the positive electrode and the negative electrode; and a nonaqueous electrolytic solution that contains a lithium salt,
wherein the positive electrode comprises a positive electrode active material of the general formula (1) below, $$LiNi_xMn_yO_4 \quad (1)$$

the negative electrode active material comprises $NiSi_6C_7$, and a solvent in the nonaqueous electrolytic solution comprises an ionic liquid that contains bis(fluorosulfonyl)imide anions as an anionic component and N-methyl-N-propylpyrrolidinium as a cationic component,
wherein x and y are values that satisfy the relations x+y=2, and x:y=27.5:72.5 to 22.5:77.5.

2. The lithium secondary battery according to claim 1, wherein the lithium secondary battery has a fully charged voltage of 4.4 V or more, and a average discharge voltage of 4.0 V or more.

3. The lithium secondary battery according to claim 1, wherein the negative electrode active material is $NiSi_6C_7$.

4. A lithium secondary battery comprising: a positive electrode; a negative electrode; a separator provided between the positive electrode and the negative electrode; and a nonaqueous electrolytic solution that contains a lithium salt,
wherein the positive electrode comprises a positive electrode active material of the general formula (1) below, $$LiNi_xMn_yO_4 \quad (1),$$

and a solvent in the nonaqueous electrolytic solution comprises an ionic liquid that contains bis(fluorosulfonyl) imide anions as an anionic component wherein x and y are values that satisfy the relations x+y=2, and x:y=27.5: 72.5 to 22.5:77.5, and the negative electrode active material is $NiSi_6C_7$.

* * * * *